US011438489B1

(12) United States Patent
Saiki et al.

(10) Patent No.: US 11,438,489 B1
(45) Date of Patent: Sep. 6, 2022

(54) IMAGING APPARATUS

(71) Applicant: Panasonic Intellectual Property Management Co., Ltd., Osaka (JP)

(72) Inventors: Jun Saiki, Hyogo (JP); Atsushi Abe, Osaka (JP); Koji Masuda, Kyoto (JP); Yujiro Kitagawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/509,016

(22) Filed: Oct. 24, 2021

(30) Foreign Application Priority Data

Mar. 11, 2021 (JP) ............................. JP2021-039397

(51) Int. Cl.
*H04N 5/225* (2006.01)
*H04N 5/77* (2006.01)

(52) U.S. Cl.
CPC ......... *H04N 5/22521* (2018.08); *H04N 5/772* (2013.01)

(58) Field of Classification Search
CPC ............................ H04N 5/22521; H04N 5/772
See application file for complete search history.

(56) References Cited

U.S. PATENT DOCUMENTS

| 2009/0310311 | A1 | 12/2009 | Kondoh | |
|---|---|---|---|---|
| 2016/0252937 | A1* | 9/2016 | Yoshida | ............... H04B 1/3833 |
| | | | | 361/679.26 |
| 2018/0107099 | A1* | 4/2018 | Yasuda | ................... G03B 17/55 |
| 2018/0278814 | A1* | 9/2018 | Yamamoto | ............... G02B 7/02 |
| 2019/0154949 | A1* | 5/2019 | Hosoe | .................... G02B 7/028 |
| 2020/0019017 | A1* | 1/2020 | Kyoukane | .......... G02F 1/133611 |
| 2020/0203672 | A1* | 6/2020 | Kuon | .................... G06F 1/1652 |
| 2020/0288048 | A1* | 9/2020 | Makara | ............. H05K 7/20209 |
| 2021/0055637 | A1* | 2/2021 | Nakamura | ............. H04N 5/772 |
| 2021/0160411 | A1* | 5/2021 | Yamagata | ............. G03B 17/55 |

FOREIGN PATENT DOCUMENTS

| JP | 2010-218955 | A | 9/2010 |
|---|---|---|---|
| JP | 2012-028940 | A | 2/2012 |
| JP | 2018-148024 | A | 9/2018 |
| JP | 2019-185497 | A | 10/2019 |
| WO | 2007/125718 | A1 | 11/2007 |

* cited by examiner

*Primary Examiner* — Sunghyoun Park
(74) *Attorney, Agent, or Firm* — Renner, Otto, Boisselle & Sklar, LLP

(57) ABSTRACT

An imaging apparatus includes: a board; a recording medium accommodation portion provided on the board and configured to removably accommodate a recording medium; a radiator plate provided at a position away from the recording medium accommodation portion; a thermal conductive sheet including a first portion fixed to the radiator plate and a second portion in contact with the recording medium accommodation portion; a cushion member configured to urge a second portion of the thermal conductive sheet toward the recording medium accommodation portion and to maintain contact between a second portion of the thermal conductive sheet and the recording medium accommodation portion; and a cushion member support member configured to support the cushion member.

7 Claims, 11 Drawing Sheets

IMAGING APPARATUS

BACKGROUND OF THE INVENTION

Field of the Invention

The present disclosure relates to an imaging apparatus.

Description of the Related Art

For example, JA 2018-148024 A discloses an imaging apparatus including a connector into which a card-type recording medium is removably inserted. The connector includes a slot board (board) and a slot cover (recording medium accommodation portion) provided on the slot board and for accommodating a recording medium. The slot board is fixed to the heat transfer means with a screw. The heat generated from the recording medium is transmitted to the heat transfer means through the slot board.

SUMMARY OF THE INVENTION

Technical Problem

Incidentally, in recent years, a removable card type recording medium has increased in capacity. As a result, the imaging apparatus can store a long-hour high-resolution captured moving image in a recording medium. However, as a result, the card-type recording medium keeps generating heat due to continuous writing. Therefore, the imaging apparatus is required to have high heat dissipation performance for the recording medium.

In addition, in order to maintain stable photographing capacity for a long period of time, an imaging apparatus capable of photographing with high resolution for long hours is required to have high maintainability (that is, ease of disassembly and assembly) from a professional photographer or the like.

Therefore, the present disclosure has an object to achieve high maintainability while securing high heat dissipation performance for a recording medium in an imaging apparatus that stores a captured moving image or the like in a removable recording medium.

Means for Solving the Problems

In order to solve the above problem, according to one aspect of the present disclosure, provided is an imaging apparatus including:
 a board;
 a recording medium accommodation portion provided on the board and configured to removably accommodate a recording medium;
 a radiator plate provided at a position away from the recording medium accommodation portion;
 a thermal conductive sheet including a first portion fixed to the radiator plate and a second portion in contact with the recording medium accommodation portion;
 a cushion member configured to urge a second portion of the thermal conductive sheet toward the recording medium accommodation portion and to maintain contact between a second portion of the thermal conductive sheet and the recording medium accommodation portion; and
 a cushion member support member configured to support the cushion member.

Effect of the Invention

According to the present disclosure, it is possible to achieve high maintainability while securing high heat dissipation performance for a recording medium in an imaging apparatus that stores a captured moving image or the like in a removable recording medium.

DESCRIPTION OF THE PREFERRED EMBODIMENTS

Hereinafter, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art.

It should be noted that the inventor(s) provides (provide) the accompanying drawings and the following description for a person skilled in the art to fully understand the present disclosure. Thus, the drawings and the description are not intended to limit the subject matter defined in the claims.

Hereinafter, an imaging apparatus according to an embodiment of the present disclosure will be described with reference to the drawings.

Figure 1:
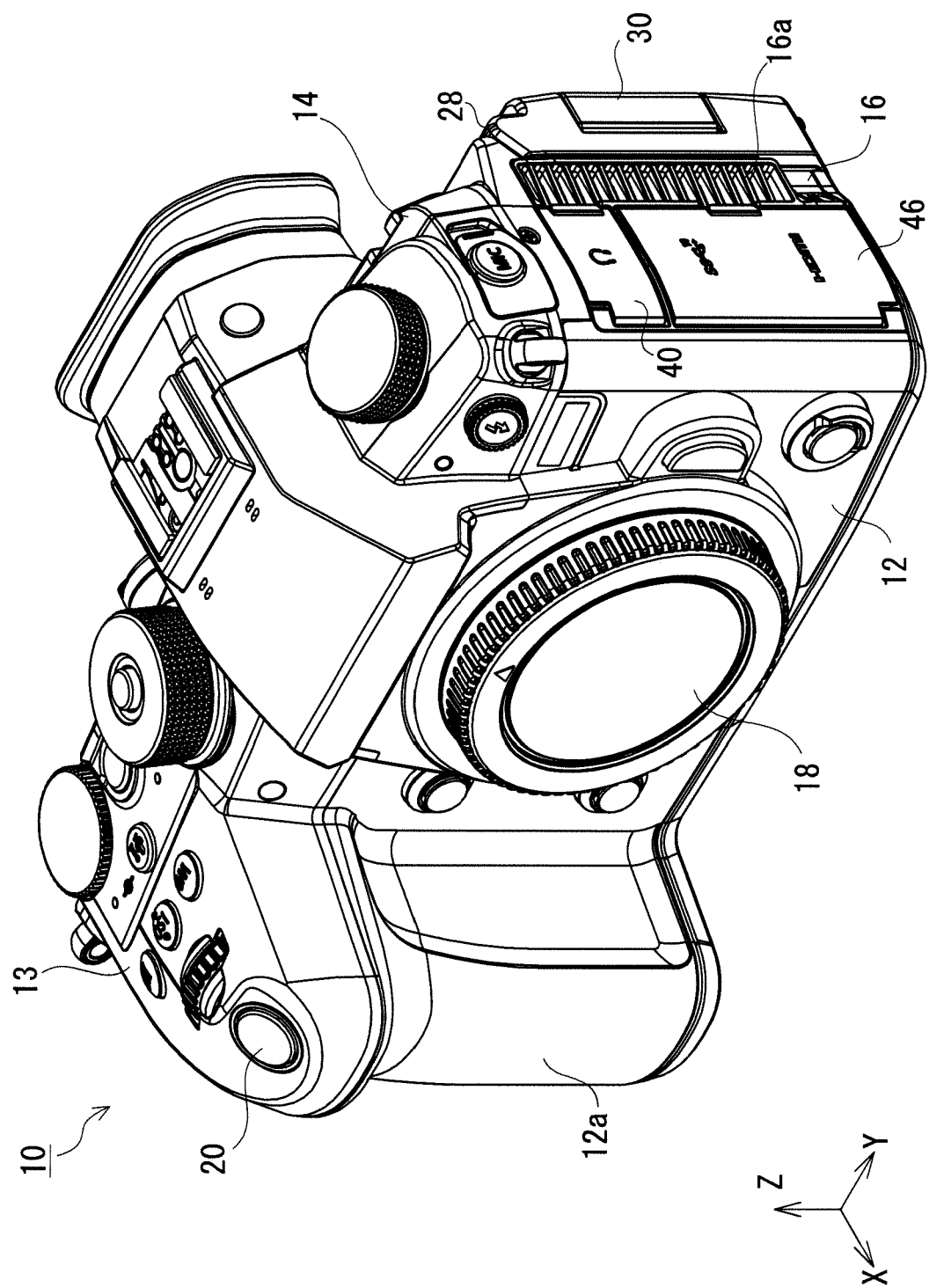
FIG. 1 is a front perspective view of an imaging apparatus according to one embodiment of the present disclosure.
Figure 2:
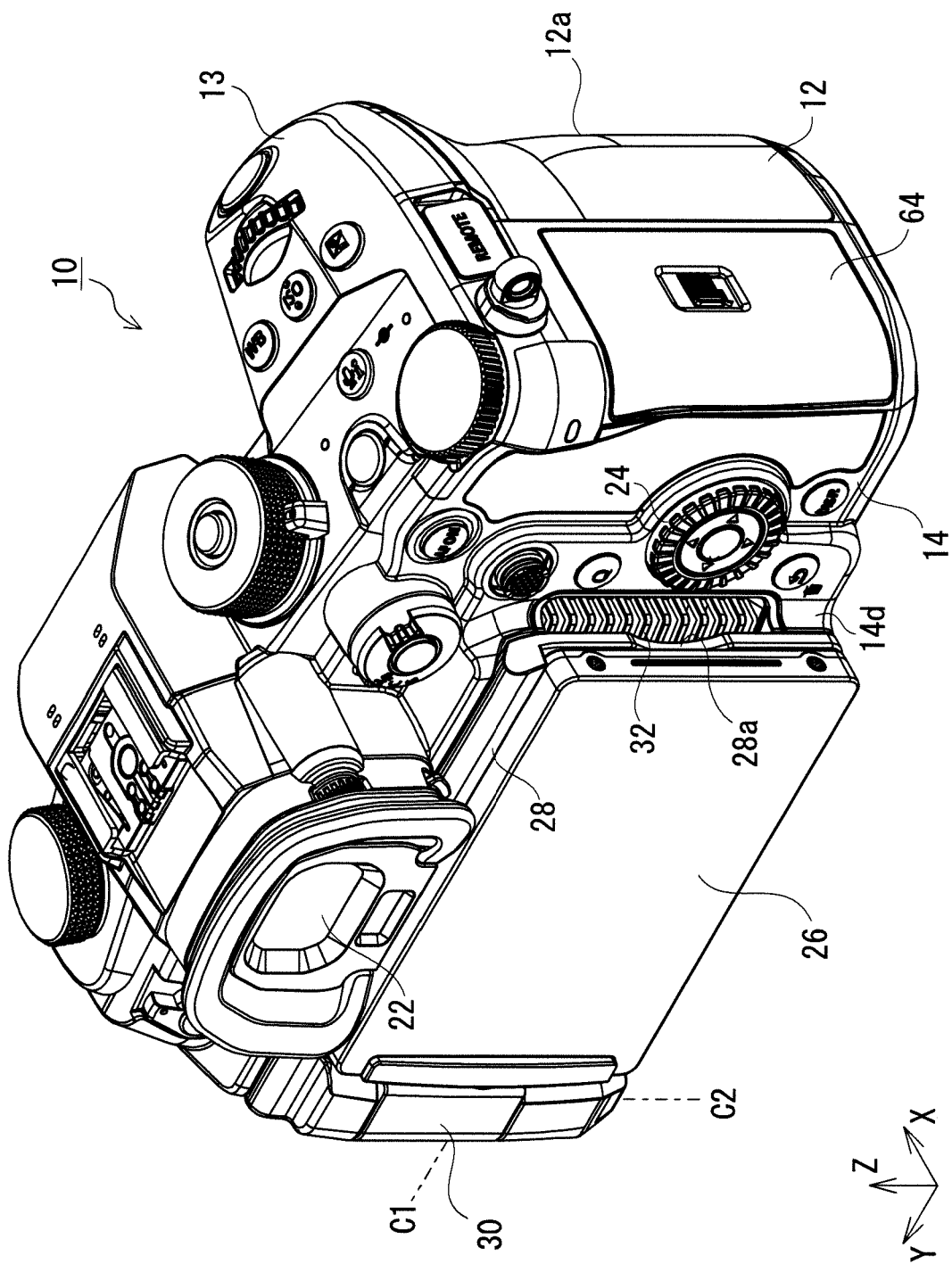
FIG. 2 is a rear perspective view of the imaging apparatus in a state where a tilt base is positioned at a retracted position.

FIG. 1 is a front perspective view of an imaging apparatus according to an embodiment of the present disclosure. In addition, FIG. 2 is a rear perspective view of the imaging apparatus in a state where the tilt base is positioned at the retracted position. Then, FIG. 3 is a rear perspective view of the imaging apparatus in a state where the tilt base is inclined.

It should be noted that the X-Y-Z orthogonal coordinate system shown in the drawings is for facilitating understanding of the present disclosure, and does not limit the present disclosure. The X-axis direction indicates the front-rear direction of the imaging apparatus, the Y-axis direction indicates the left-right direction of the imaging apparatus, and the Z-axis direction indicates the height direction. In addition, in the present specification, a side on which the subject is present with respect to the imaging apparatus is referred to as a "front side", and a side on which the imaging apparatus is present with respect to the subject is referred to as a "rear side".

Figure 3:
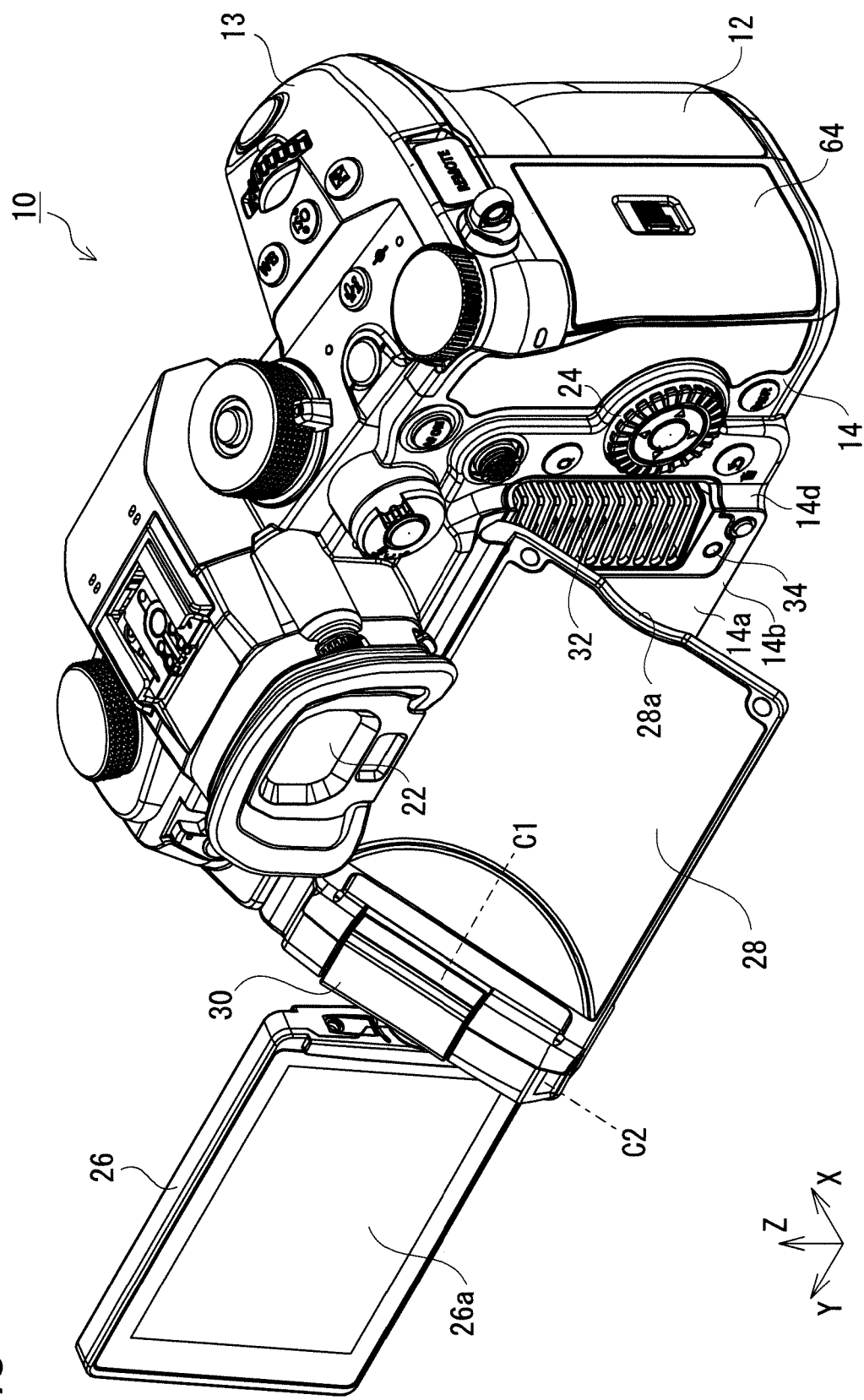
FIG. 3 is a rear perspective view of the imaging apparatus in a state where the tilt base is inclined.

As shown in FIGS. 1 to 3, in the case of the present embodiment, the casing of the imaging apparatus 10 includes a front casing 12 positioned on the front side, a top casing 13 positioned on the upper side, a rear casing 14 positioned on the rear side, and a side casing 16 positioned on the left side.

As shown in FIG. 1, the front casing 12 is provided with a lens attachment portion. It should be noted that in the figure, the lens attachment portion is hidden by the lens cap 18. In addition, the front casing 12 is provided with a hand grip portion 12a to be gripped by the user's right hand. Furthermore, the front casing 12 is provided with a plurality of man-machine interfaces.

The top casing 13 is provided with a plurality of man-machine interfaces such as a shutter button 20.

As shown in FIGS. 2 and 3, the rear casing 14 is provided with a view finder 22. In addition, the rear casing 14 is provided with a plurality of man-machine interfaces such as a dial 24. It should be noted that some man-machine interfaces such as the dial 24 are arranged in the right side portion of the outer side surface of the rear casing 14 (that is, the rear surface of the imaging apparatus 10) so as to be operable by the thumb of the right hand of the user who grips the hand grip portion 12a.

Furthermore, as shown in FIGS. 2 and 3, in the case of the present embodiment, a monitor 26 is mounted in the left side portion on the outer side surface of the rear casing 14. Specifically, the monitor 26 is attached to the rectangular plate-shaped tilt base 28 via a hinge 30. A raised portion 14b having a flat top surface 14a is formed on an outer side surface of the rear casing 14. The tilt base 28 is provided so as to be tiltable with respect to the top surface 14a of the raised portion 14b. Specifically, the tilt base 28 rotates about a rotation center line extending in the left-right direction (Y-axis direction) of the imaging apparatus 10. It should be noted that FIG. 2 shows a state where the tilt base 28 is closest to the top surface 14a of the raised portion 14b, that is, the tilt base 28 positioned at the retracted position.

The monitor 26 is, for example, a liquid crystal monitor including a display surface 26a. For example, the monitor 26 displays an image (through image) indicated by image data obtained by capturing by the image sensor and performing image processing by the image processing unit. The monitor 26 is provided on the tilt base 28 to be movable between a position overlapping with the tilt base 28 and a position away from the tilt base 28. Specifically, the monitor 26 is supported by the hinge 30 to be rotatable about a rotation center line C1 extending in the left-right direction (Y-axis direction) of the imaging apparatus 10. The hinge 30 is supported by the tilt base 28 to be rotatable about a rotation center line C2 parallel to the tilt base 28 while being orthogonal to the rotation center line C1. With this hinge 30, the monitor 26 is retracted in a state where the display surface 26a overlaps the tilt base 28 as shown in FIG. 2. In addition, as shown in FIG. 3, the monitor 26 can take an attitude in which the monitor 26 is away from the tilt base 28 and the display surface 26a faces the rear side of the imaging apparatus 10.

It should be noted that to facilitate rotation of the monitor 26 about the rotation center line C2 from the retracted state shown in FIG. 2, an arc-shaped recessed portion 28a is formed at a right end of the tilt base 28. This recessed portion 28a exposes a part of the display surface 26a of the monitor 26 overlapping the tilt base 28. Thus, the user's finger is likely to be caught on the exposed portion, that is, the free end of the monitor 26 (that is, the distal end farther from the hinge 30 in the left-right direction (Y-axis direction)), and as a result, the user can easily rotate the monitor 26 (as compared with the case where there is no recessed portion 28a).

In addition, the recessed portion 28a of the tilt base 28 prevents the thumb of the right hand of the user who rotates the dial 24 from coming into contact with the tilt base 28. Accordingly, the user can smoothly rotate the dial 24 without feeling stress. In other words, the presence of the recessed portion 28a enables the dial 24 to be arranged near the tilt base 28, and as a result, the size in the left-right direction (Y-axis direction) of the imaging apparatus 10 can be reduced.

Furthermore, in the case of the present embodiment, the rear casing 14 is provided with an intake port and an exhaust port.

Figure 4:
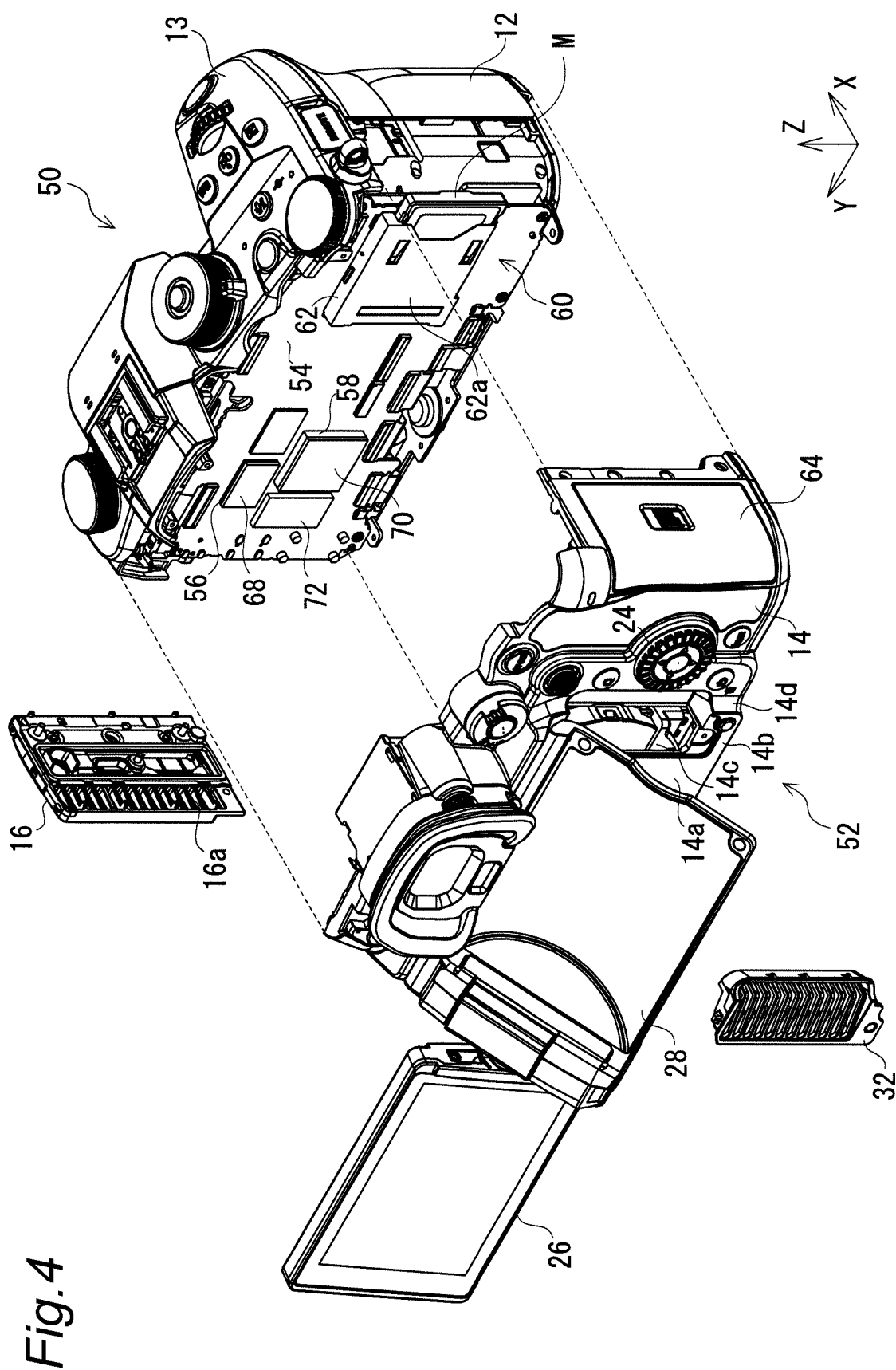
FIG. 4 is a rear perspective view of the imaging apparatus in a disassembled state for maintenance.
Figure 5:
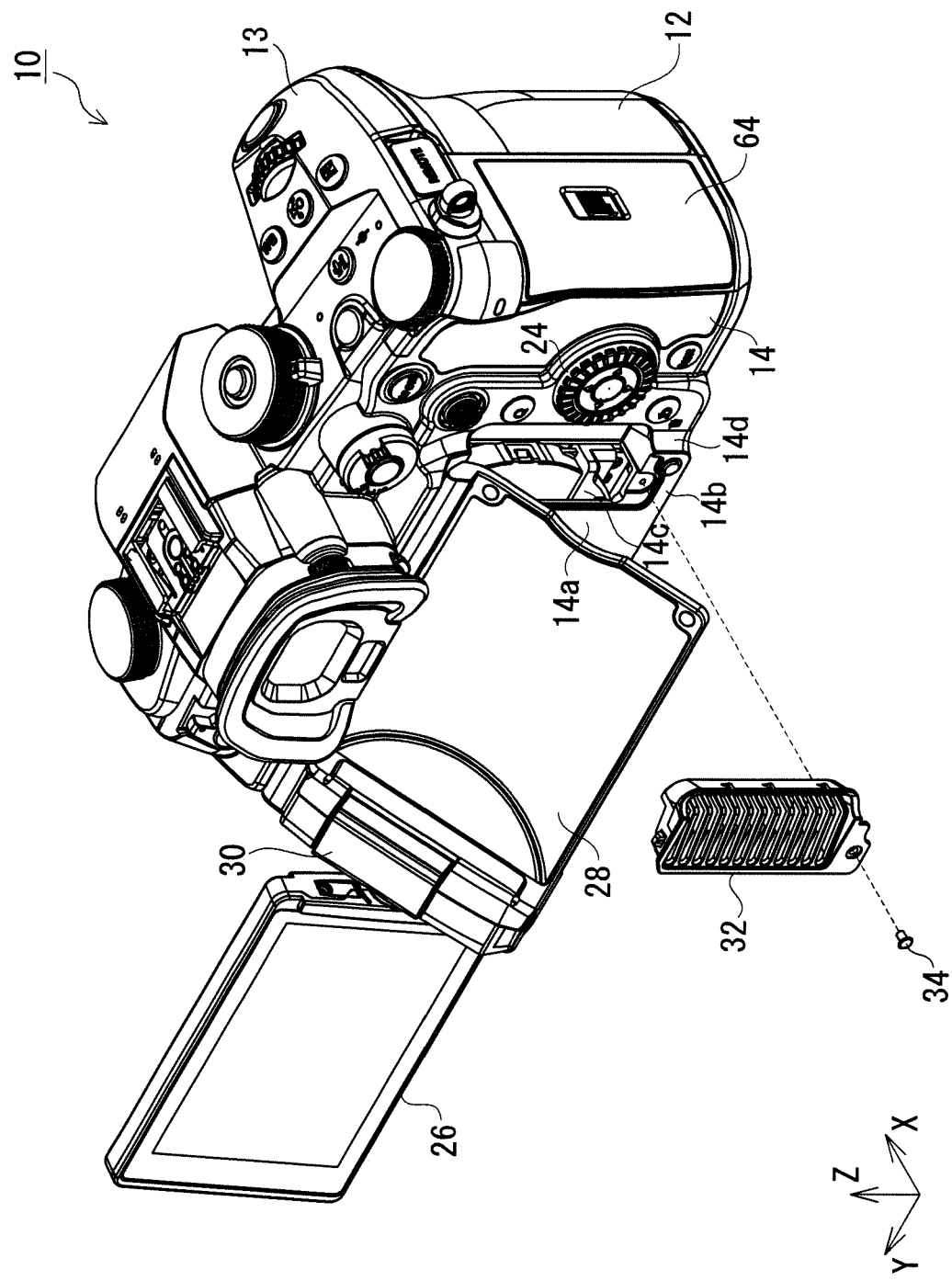
FIG. 5 is a rear perspective view of the imaging apparatus in a state where an intake port cover is removed.
Figure 6:
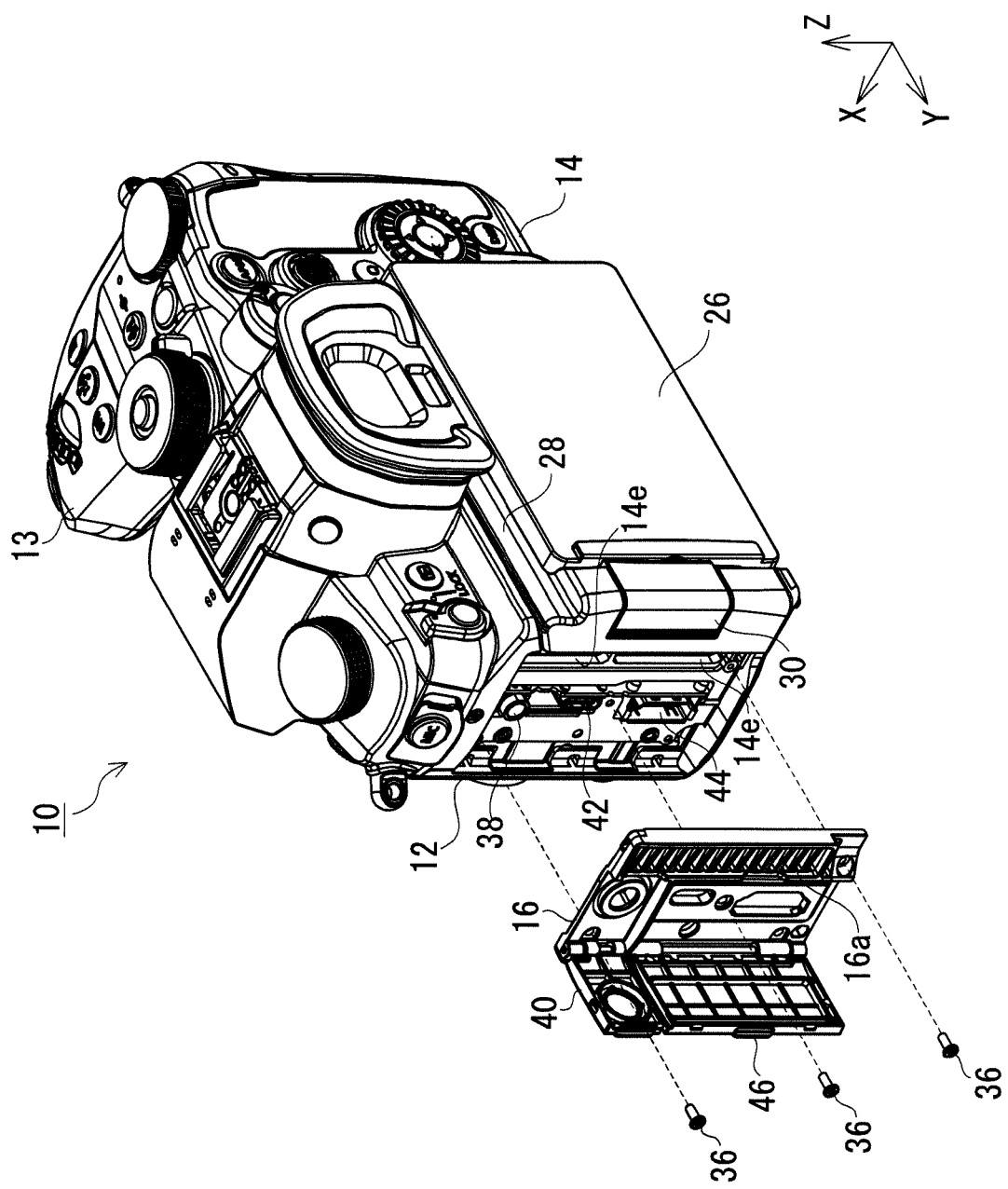
FIG. 6 is a side perspective view of the imaging apparatus in a state where a side casing is removed.

FIG. 4 is a rear perspective view of the imaging apparatus in a disassembled state for maintenance. In addition, FIG. 5 is a rear perspective view of the imaging apparatus in a state where the intake port cover is removed. Then, FIG. 6 is a side perspective view of the imaging apparatus in a state where the side casing is removed. It should be noted that FIG. 4 shows the front casing 12 in a state where the top casing 13 is attached.

As shown in FIGS. 4 and 5, the rear casing 14 is provided with an intake port 14c for taking in the outside air into the imaging apparatus 10. Specifically, the intake port 14c is formed from the top surface 14a of the raised portion 14b of the rear casing 14 to the side surface 14d of the raised portion 14b on the dial 24 side.

In addition, in order to prevent large foreign matter from entering the intake port 14c, an intake port cover 32 is attached to the intake port 14c. In the case of the present embodiment, the intake port cover 32 is fixed to the rear casing 14 with one screw 34 to facilitate cleaning of the inside of the imaging apparatus 10 near the intake port 14c. The screw 34 is attached to the rear casing 14 in the front-rear direction (X-axis direction) of the imaging apparatus 10. In addition, as shown in FIG. 2, the screw 34 is provided at a position covered by the tilt base 28 in the retracted state as shown in FIG. 2, and is provided at a position where a tool that rotates the screw 34 can access the screw 34 in the front-rear direction (X-axis direction) when the tilt base 28 is inclined as shown in FIG. 5.

It should be noted that as shown in FIG. 2, the recessed portion 28a of the tilt base 28 is positioned on the intake port cover 32. To describe this, when the tilt base 28 is in the retracted state as shown in FIG. 2, the right side end portion of the tilt base 28 covers a part of the intake port cover 32 (that is, intake port 14c). Thus, the intake efficiency of the intake port 14c decreases as compared with the case where the tilt base 28 is inclined away from the top surface 14a of the raised portion 14b as shown in FIG. 3. In order to suppress a decrease in intake efficiency when the tilt base 28 is in the retracted state, the recessed portion 28a of the tilt base 28 in the retracted state is positioned on the intake port cover 32.

As shown in FIG. 6, the rear casing 14 is provided with an exhaust port 14e for exhausting the outside air taken into the imaging apparatus 10 through the intake port 12c. Specifically, an exhaust port 14e is formed in a left side portion of the rear casing 14.

In the exhaust port 14e, large foreign matter is prevented from entering by an exhaust port cover portion 16a formed in the side casing 16. In the case of the present embodiment, in order to facilitate cleaning of the inside of the imaging apparatus 10 near the exhaust port 14e, the side casing 16 is attached to the front casing 12 and the rear casing 14 with three screws 36. It should be noted that the side casing 16 is provided with a door-shaped cover 40 for protecting the earphone jack 38, and a door-shaped cover 46 for protecting the USB terminal connector 42 and the HDMI (registered trademark) connector 44.

As shown in FIG. 4, the imaging apparatus 10 is configured to be disassembled into a front unit 50 and a rear unit 52 in consideration of maintenance. For example, the imaging apparatus 10 is disassembled into the front unit 50 and the rear unit 52 by removing a plurality of screws (not shown).

Figure 7:
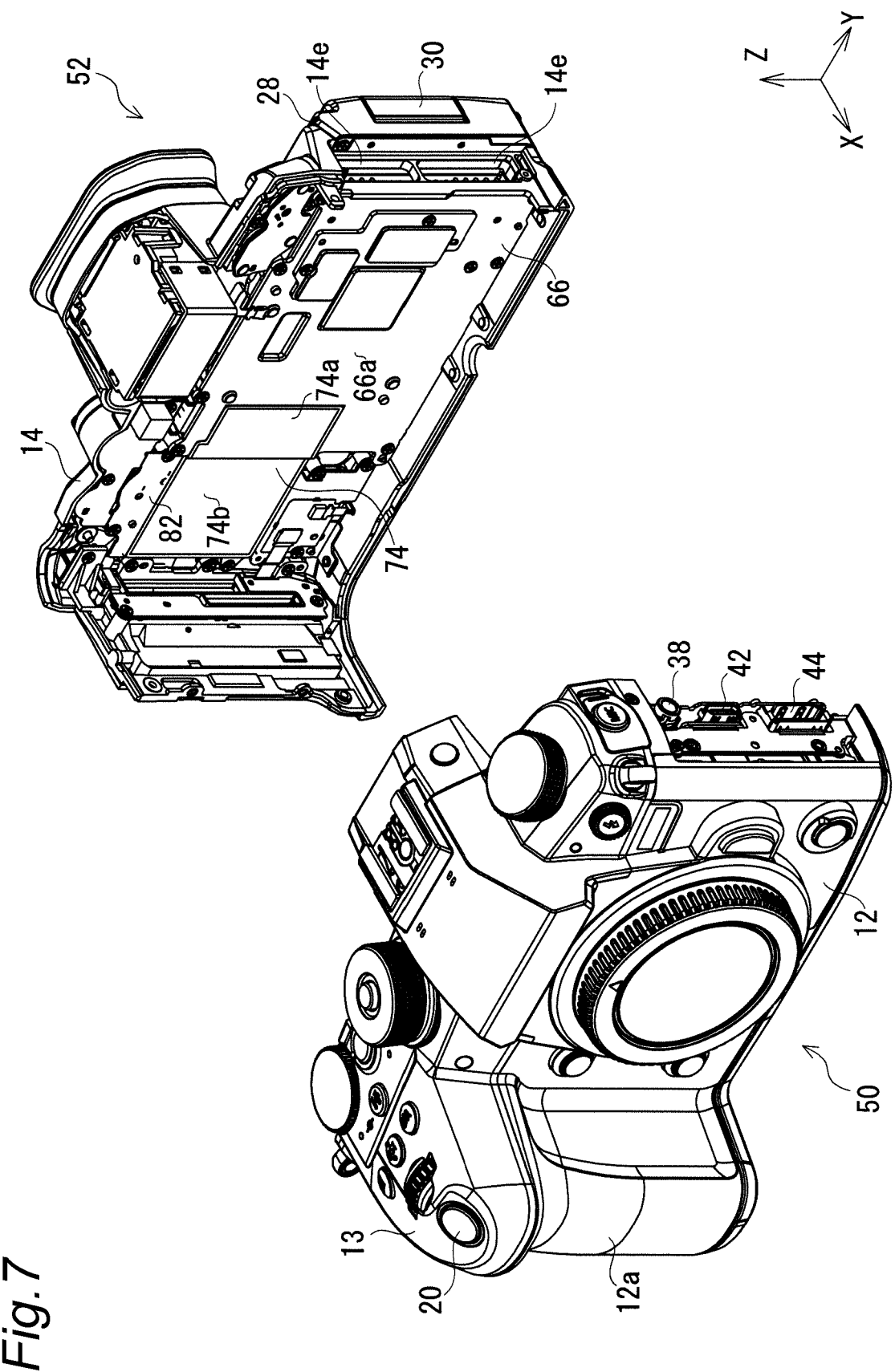
FIG. 7 is a front perspective view of the imaging apparatus in a state of being disassembled into a front unit and a rear unit.

FIG. 7 is a front perspective view of the imaging apparatus in a state of being disassembled into a front unit and a rear unit. It should be noted that FIG. 7 shows the front casing 12 in a state where the top casing 13 is attached.

As shown in FIGS. 4 and 7, the front unit 50 is configured by incorporating a plurality of components in the front casing 12, and the rear unit 52 is configured by incorporating a plurality of components in the rear casing 14. It should be noted that in FIGS. 4 and 7, a flexible cable and the like that electrically connect the front unit 50 and the rear unit 52 are omitted.

As shown in FIG. 4, a board 54 is provided inside the front unit 50. In the case of the present embodiment, the board 54 is provided over the entire front casing 12 in the left-right direction (Y-axis direction) of the imaging apparatus 10. The rear surface of the board 54 (the surface on the rear side of the imaging apparatus 10) is mounted with a memory 56 such as a DRAM, an IC chip 58 for performing image processing, and the like. In the case of the present embodiment, the memory 56 and the IC chip 58 are provided in the left side portion of the board 54.

In addition, the rear surface of the board 54 is provided with a card connector 60 into which the recording medium M is removably inserted. The recording medium M is a card-type recording medium (what is called a memory card), and is, for example, a CFexpress card. Specifically, the card connector 60 roughly includes a part of the board 54 provided with a terminal (not shown) electrically connected to a terminal of the recording medium M, and a connector frame (recording medium accommodation portion) 62 that covers the part of the board 54, in a state of leaving a space for the recording medium M to enter, and maintains contact between the terminal on the board 54 and the terminal of the recording medium M. The connector frame 62 is formed by machining a metal thin plate such as stainless steel. In the case of the present embodiment, the card connector 60 is provided in the right side portion of the board 54 away from the memory 56 and the IC chip 58. It should be noted that the recording medium M can access the card connector 60 by opening the connector cover 64 provided in the right side portion of the imaging apparatus 10.

As shown in FIG. 7, a radiator plate 66 is provided inside the rear unit 52. The radiator plate 66 is a plate-shaped member made of a metal material such as copper having high thermal conductivity. The radiator plate 66 cools the recording medium M inserted in the card connector 60 by absorbing heat from the connector frame 62 of the card connector 60. In addition, in the case of the present embodiment, the radiator plate 66 cools the memory 56 and the IC chip 58 (heat source) by absorbing heat from these components. It should be noted that in the case of the present embodiment, the radiator plate 66 is not provided over the entire rear casing 14 in the left-right direction (Y-axis direction) of the imaging apparatus 10, but is provided from the central portion to the left side portion of the rear casing 14.

The imaging apparatus 10 includes a heat transfer element that thermally connects the memory 56, the IC chip 58, and the card connector 60 provided in the front unit 50 to the radiator plate 66 provided in the rear unit 52.

Figure 8A:
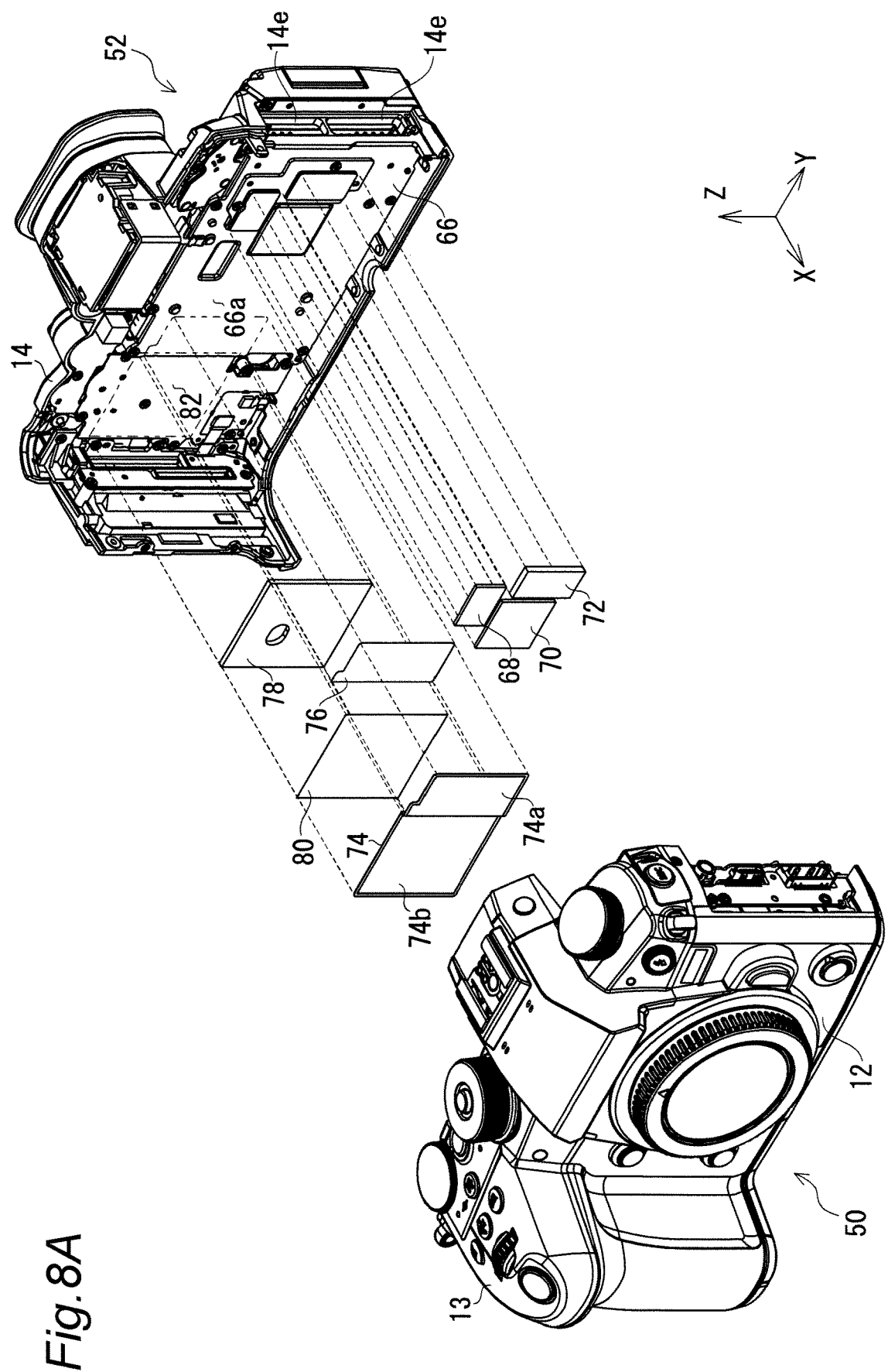
FIG. 8A is a front perspective view of the imaging apparatus showing heat transfer elements that thermally connect the front unit and the rear unit.
Figure 8B:
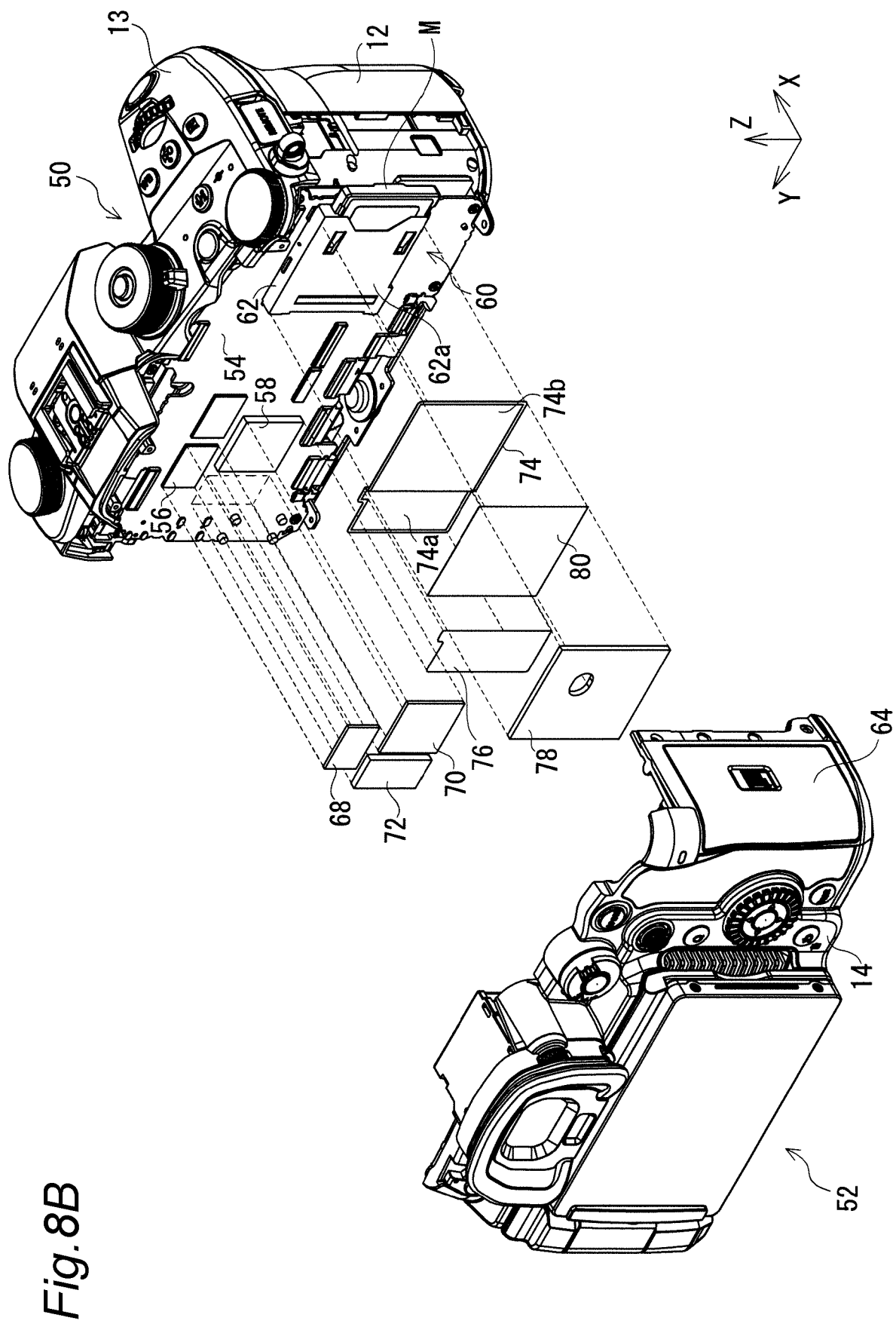
FIG. 8B is a rear perspective view of the imaging apparatus showing heat transfer elements that thermally connect the front unit and the rear unit.

FIGS. 8A and 8B are perspective views of the imaging apparatus showing heat transfer elements that thermally connect the front unit and the rear unit. FIG. 8A is a front perspective view, and FIG. 8B is a rear perspective view. It should be noted that FIGS. 8A and 8B show the front casing 12 in a state of the top casing 13 attached.

As shown in FIGS. 8A and 8B, the radiator plate 66 faces the memory 56 and the IC chip 58 in the thickness direction of the board 54, that is, in the front-rear direction (X-axis direction) of the imaging apparatus 10. Therefore, in order to thermally connect the memory 56 and the IC chip 58 to the radiator plate 66, the silicon adhesive sheets 68 and 70 having high thermal conductivity and flexibility are arranged therebetween. The silicon adhesive sheets 68 and 70 are in surface contact with the memory 56 and the IC chip 58, and are in surface contact with the front surface 66a of the radiator plate 66 (surface on the front side of the imaging apparatus 10). In addition, the silicon adhesive sheet 72 is also arranged between a portion of the board 54 near the memory 56 and the IC chip 58 and the radiator plate 66. The silicon adhesive sheet 72 is in surface contact with the board 54 and is in surface contact with the radiator plate 66. Heat of the memory 56, the IC chip 58, and the board 54 is transferred to the radiator plate 66 through the silicon adhesive sheets 68, 70, and 72.

It should be noted that the silicon adhesive sheets 68, 70, and 72 have self-adhesiveness that can be repeatedly attached. Therefore, when the imaging apparatus 10 is disassembled into the front unit 50 and the rear unit 52 for maintenance, the silicon adhesive sheets 68, 70, and 72 remain on the memory 56, the IC chip 58, and the board 54 (or, remain on the radiator plate 66) as shown in FIG. 4. Then, when the maintenance is completed and the front unit 50 and the rear unit 52 are united again, the silicon adhesive sheets 68, 70, and 72 thermally connect the memory 56, the IC chip 58, and the board 54 to the radiator plate 66 again. Therefore, the imaging apparatus 10 has high maintainability (ease of disassembly and assembly) while securing high heat dissipation with respect to the memory 56, the IC chip 58, and the board 54. That is, thermal connection between the memory 56, the IC chip 58, and the board 54 and the radiator plate 66 is released by only disassembling into the front unit 50 and the rear unit 52. In addition, thermal connection between the memory 56, the IC chip 58, and the board 54 and the radiator plate 66 is established by only uniting the front unit 50 and the rear unit 52. As a result, the user does not need to perform any work on the thermal connection between the memory 56, the IC chip 58, and the board 54 and the radiator plate 66.

On the other hand, as shown in FIGS. 8A and 8B, the radiator plate 66 does not face the connector frame 62 of the card connector 60 in the thickness direction of the board 54, that is, the front-rear direction (X-axis direction) of the imaging apparatus 10. Specifically, the radiator plate 66 is provided at a position away to the left side with respect to the connector frame 62 of the card connector 60. As means for thermally connecting the connector frame 62 of the card connector 60 and the radiator plate 66, which are separated in this manner, the imaging apparatus 10 includes a thermal conductive sheet 74.

As shown in FIG. 8A, the thermal conductive sheet 74 is a flexible sheet having high thermal conductivity, and is a thin strip-shaped sheet extending in the left-right direction (Y-axis direction) of imaging apparatus 10 in the case of the present embodiment. In addition, in the case of the present embodiment, the thermal conductive sheet 74 is a graphite sheet. The graphite sheet is obtained by processing graphite having high thermal conductivity into a thin sheet shape.

As shown in FIGS. 7 and 8A, one end (first portion) 74a of the thermal conductive sheet 74 is attached and fixed to the right end of the radiator plate 66 included in the rear unit 52 via an adhesive sheet 76. As a result, the thermal conductive sheet 74 is included in the rear unit 52.

In order to easily disassemble into the front unit 50 and the rear unit 52, the thermal conductive sheet 74 is not fixed to the connector frame 62 of the card connector 60 included in the front unit 50. The thermal conductive sheet 74 is simply brought into surface contact with the top plate portion 62a of the connector frame 62 via the other end (second portion) 74b thereof. In order to maintain the surface contact, the imaging apparatus 10 includes a cushion member 78 that urges the other end 74b of the thermal conductive sheet 74 toward the top plate portion 62a of the connector frame 62.

The cushion member 78 is made of an elastic material such as urethane foam, and has lower rigidity than the connector frame 62. In the case of the present embodiment, the cushion member 78 is attached to the second portion 74b of the thermal conductive sheet 74 via the adhesive sheet 80. In addition, the cushion member 78 is provided in the rear casing 14, and is supported by a base plate (cushion member support member) 82 to which a man-machine interface such as the dial 24 provided in the rear casing 14 is attached.

In a state where the front unit 50 and the rear unit 52 are united, the second portion 74b of the thermal conductive sheet 74 is sandwiched between the top plate portion 62a of the connector frame 62 and the cushion member 78. In this state, the cushion member 78 is compressed and deformed between the connector frame 62 and the base plate 82. Thus, the cushion member 78 urges the second portion 74b of the thermal conductive sheet 74 toward the connector frame 62 with an urging force that does not deform the connector frame 62. Thus, the contact between the thermal conductive sheet 74 and the connector frame 62 is maintained. As a result, the connector frame 62 is thermally connected to the radiator plate 66 via the thermal conductive sheet 74.

When the imaging apparatus 10 is disassembled into the front unit 50 and the rear unit 52 for maintenance, the second portion 74b of the thermal conductive sheet 74 is separated from the top plate portion 62a of the connector frame 62. When the maintenance is completed and the front unit 50 and the rear unit 52 are united again, the second portion 74b of the thermal conductive sheet 74 is brought into surface contact with the top plate portion 62a of the connector frame 62 again. Therefore, the imaging apparatus 10 has high maintainability (ease of disassembly and assembly) while securing high heat dissipation from the connector frame 62, specifically, from the recording medium M inserted into the connector frame 62. That is, thermal connection between the connector frame 62 and the radiator plate 66 is released by only disassembling into the front unit 50 and the rear unit 52. In addition, thermal connection between the connector frame 62 and the radiator plate 66 is established by only uniting the front unit 50 and the rear unit 52. As a result, at the time of maintenance such as repair, it is not necessary to perform some work regarding thermal connection between the connector frame 62 and the radiator plate 66. In addition, since the thermal conductive sheet 74 is not broken when the rear unit 52 is removed, the thermal conductive sheet 74 can be reused.

It should be noted that in the case of the present embodiment, the cushion member 78 is attached to the second portion 74b of the thermal conductive sheet 74 via the adhesive sheet 80. In place of this, the cushion member 78 may be attached to the base plate 82 without being attached to the thermal conductive sheet 74. In addition, in place of the base plate 82, another member that supports the cushion member 78 may be provided in the rear unit 52.

In the case of the present embodiment, the radiator plate 66 is cooled by outside air.

Figure 9A:
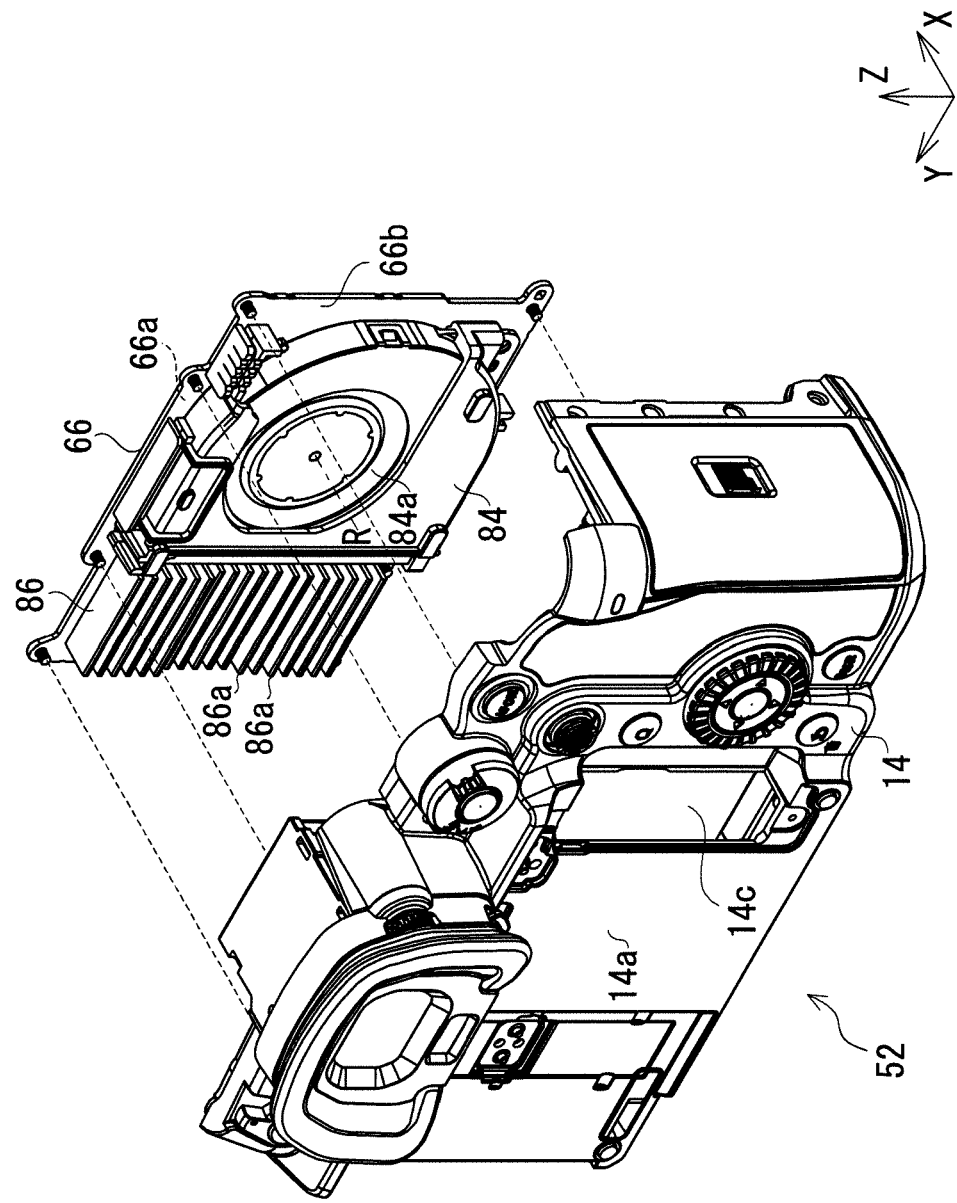
FIG. 9A is a rear perspective view of the rear unit from which a radiator plate has been removed.
Figure 9B:
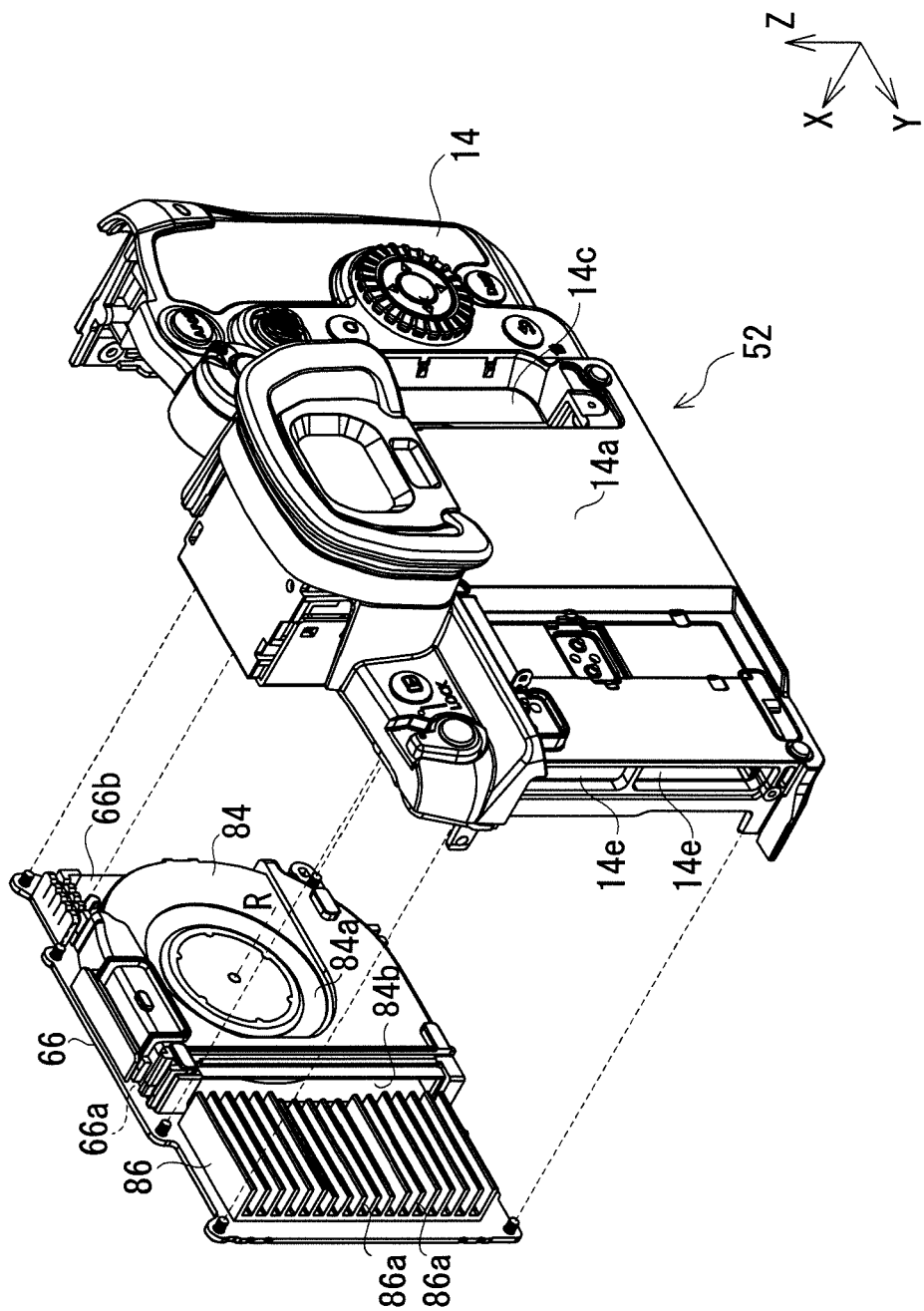
FIG. 9B is a side perspective view of the rear unit from which a radiator plate has been removed.

FIGS. 9A and 9B show the rear unit with the radiator plate removed. FIG. 9A is a front perspective view, and FIG. 9B is a rear perspective view. It should be noted that in FIGS. 9A and 9B, the monitor 26, the tilt base 28, and the hinge 30 are omitted.

As described above, and as shown in FIG. 9A, the intake port 14c is provided in the rear casing 14 of the rear unit 52. The outside air having passed through the intake port 14c flows into between the radiator plate 66 and the rear casing 14. In order to generate such inflow of outside air, a fan 84 is attached to the rear surface 66b of the radiator plate 66 facing the rear casing 14. That is, the fan 84 is included in the rear unit 52.

In the case of the present embodiment, as shown in FIG. 9B, the fan 84 is a sirocco fan. Specifically, the fan 84 sucks outside air in the extending direction (X-axis direction) of the rotation center line R of the fan via the suction port 84a. The fan 84 blows out the sucked outside air in a direction orthogonal to the extending direction of the rotation center line R (Y-axis direction) via the blowout port 84b. It should be noted that the fan 84 is provided in the rear unit 52 so that the extending direction of the rotation center line R is parallel to the front-rear direction of the imaging apparatus 10.

In addition, the heat sink 86 is arranged in front of the blowout port 84b of the fan 84. The heat sink 86 is attached to and thermally connected to the rear surface 66b of the radiator plate 66. In addition, the heat sink 86 includes a plurality of fins 86a each extending in the left-right direction (Y-axis direction) of the imaging apparatus 10 and being side by side in the height direction (Z-axis direction) at intervals.

When the fan 84 rotates, outside air is sucked into the imaging apparatus 10 through the intake port 14c (intake port cover 32) of the rear casing 14. The sucked outside air enters the fan 84 through the suction port 84a and is blown out through the blowout port 84b. The blown-out outside air passes through between the plurality of fins 86a of the heat sink 86. At this time, the outside air takes away heat transferred from the radiator plate 66 to the heat sink 86 through the plurality of fins 86a. Then, the outside air in a high-temperature state by taking heat is discharged to the outside of the imaging apparatus 10 through the exhaust port 14e (exhaust port cover portion 16a) of the rear casing 14. The radiator plate is cooled by the flow of the outside air, and as a result, the connector frame 62 of the card connector 60, the memory 56, the IC chip 58, and the board 54 which are thermally connected to the radiator plate 66 are cooled.

According to the present embodiment as described above, in an imaging apparatus that stores a captured moving image or the like in a removable recording medium, it is possible to achieve high maintainability while securing high heat dissipation performance for the recording medium. That is, even if the connector of the recording medium and the radiator plate are included in separate units when the imaging apparatus is disassembled into a plurality of units for maintenance, thermal connection between the connector frame of the connector and the radiator plate can be easily released in a restorable manner.

Although the embodiment of the present disclosure has been described above with reference to the above-described embodiment, the embodiment of the present disclosure is not limited to the above-described embodiment.

For example, in the case of the above-described embodiment, as shown in FIGS. 8A and 8B, the thermal conductive sheet 74 that thermally connects the connector frame 62 of the card connector 60 and the radiator plate 66 is a graphite sheet, but the embodiment of the present disclosure is not limited thereto. The thermal conductive sheet 74 may be, for example, a sheet-shaped thin copper plate. However, as shown in FIGS. 8A and 8B, when the thermal conductive sheet 74 needs to be bent and/or when the top plate portion 62a of the connector frame 62 has irregularities, a graphite sheet having higher flexibility is preferable.

In addition, in the case of the above-described embodiment, the board 54 on which the card connector 60 is provided is included in the front unit 50, and the radiator plate 66 is included in the rear unit 52. However, the embodiment of the present disclosure is not limited thereto. For example, the board on which the card connector is provided may be included in the rear unit, and the radiator plate 66 may be included in the front unit.

Furthermore, in the case of the above-described embodiment, the radiator plate 66 faces the memory 56, the IC chip 58, and the board 54 in the thickness direction of the board 54 in order to absorb heat from these components. Then, the connector frame 62 of the card connector 60 provided away from the radiator plate 66 is thermally connected to the radiator plate 66 via the thermal conductive sheet 74. However, the embodiment of the present disclosure is not limited thereto. A radiator plate dedicated to the connector frame of the card connector may be separately provided.

Furthermore, in the case of the above-described embodiment, the radiator plate 66 is forcibly cooled by the fan 84 via the heat sink 86. However, the embodiment of the present disclosure is not limited thereto. For example, the radiator plate may be cooled without a fan as long as the recording medium M can be sufficiently cooled.

In addition, in the case of the above-described embodiment, the recording medium M removable from the imaging apparatus 10 is a card-type recording medium, that is, a CFexpress card being an example of a memory card. However, the embodiment of the present disclosure is not limited thereto. The recording medium has only to be a recording medium removably accommodated in a recording medium accommodation portion provided on the board. For example, the recording medium may be a memory card such as an SD card or a microSD card.

That is, in a broad sense, an imaging apparatus according to an embodiment of the present disclosure includes: a board; a recording medium accommodation portion provided on the board and configured to removably accommodate a recording medium; a radiator plate provided at a position away from the recording medium accommodation portion; a thermal conductive sheet including a first portion fixed to the radiator plate and a second portion in contact with the recording medium accommodation portion; a cushion member configured to urge a second portion of the thermal conductive sheet toward the recording medium accommodation portion and to maintain contact between a second portion of the thermal conductive sheet and the recording medium accommodation portion; and a cushion member support member configured to support the cushion member.

It should be noted that selectively, the imaging apparatus according to the embodiment of the present disclosure may be an imaging apparatus including: an intake port provided on a rear surface of a casing; a tilt base tiltable with respect to the rear surface and including an end portion that covers at least a portion of the intake port in a state of being closest to the rear surface; and a monitor provided on the tilt base so as to be movable between a first position overlapping with the tilt base and a second position away from the tilt base. The end portion of the tilt base includes a recessed portion that exposes a portion of a surface of the monitor facing the tilt base when the monitor is positioned at the first position. The recessed portion is positioned on the intake port in a state where the tilt base is closest to the rear surface.

As described above, the above-described embodiment has been described as the exemplification of the technique in the present disclosure. To that end, drawings and a detailed description are provided. Therefore, among the components described in the drawings and the detailed description, not only the components essential for solving the problem, but also the components not essential for solving the problem may be included in order to exemplify the above technique. Therefore, it should not be recognized that these non-essential components are essential immediately because these non-essential components are described in the drawings and the detailed description.

In addition, since the above embodiment is for exemplifying the technique in the present disclosure, various changes, substitutions, additions, omissions, and the like can be made within the scope of the claims or the equivalent thereof.

The present disclosure is applicable to an imaging apparatus that cools a removable recording medium.

What is claimed is:

1. An imaging apparatus comprising:
    a board;
    a recording medium accommodation portion provided on the board and configured to removably accommodate a recording medium;
    a radiator plate provided at a position away from the recording medium accommodation portion;
    a thermal conductive sheet including a first portion fixed to the radiator plate and a second portion in contact with the recording medium accommodation portion;
    a cushion member configured to urge a second portion of the thermal conductive sheet toward the recording medium accommodation portion and to maintain contact between a second portion of the thermal conductive sheet and the recording medium accommodation portion; and
    a cushion member support member configured to support the cushion member.

2. The imaging apparatus according to claim 1, wherein in a thickness direction of the board, the radiator plate faces and is in contact with a heat source provided on the board away from the recording medium accommodation portion.

3. The imaging apparatus according to claim 1,
    wherein the imaging apparatus is configured to be disassembled into a front unit positioned on a front side and a rear unit positioned on a rear side,
    wherein the board is included in the front unit, and wherein the radiator plate, the thermal conductive sheet, and the cushion member support member are included in the rear unit.

4. The imaging apparatus according to claim 3, further comprising a fan included in the rear unit and configured to cool the radiator plate.

5. The imaging apparatus according to claim 1, wherein the thermal conductive sheet is a graphite sheet.

6. The imaging apparatus according to claim 1, wherein the recording medium is a memory card.

7. The imaging apparatus according to claim 6, wherein the recording medium is a CFexpress card.

* * * * *